July 31, 1923.
J. MAIER ET AL
1,463,625
CREAM SEPARATOR FOR MILK CONTAINERS
Filed Sept. 30, 1922
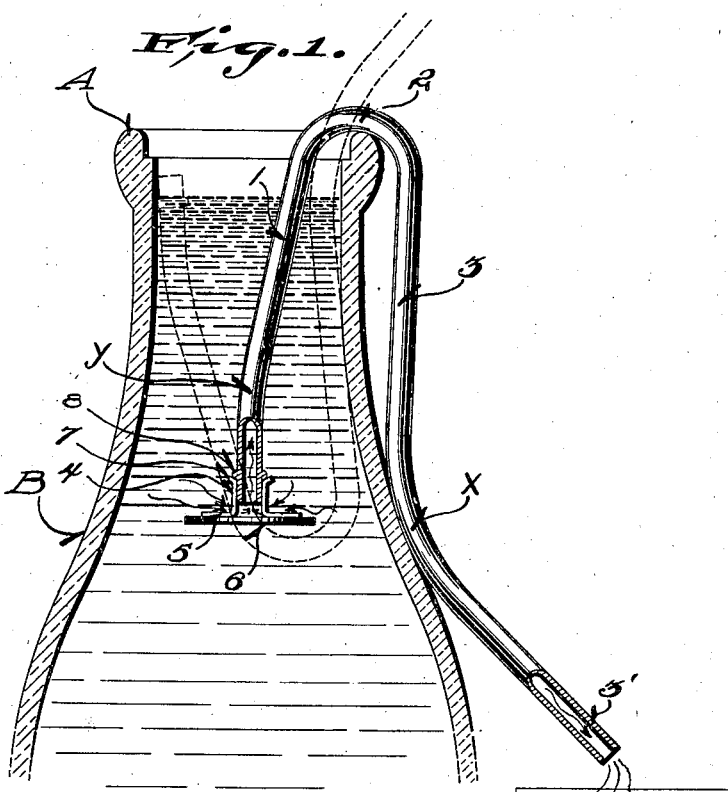
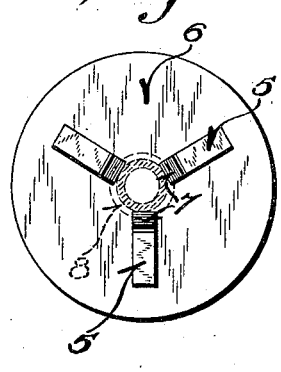

Patented July 31, 1923.

1,463,625

UNITED STATES PATENT OFFICE.

JACOB MAIER, NICHOLAS LENZ, AND CLARENCE E. RADMER, OF MILWAUKEE, WISCONSIN.

CREAM SEPARATOR FOR MILK CONTAINERS.

Application filed September 30, 1922. Serial No. 591,662.

*To all whom it may concern:*

Be it known that we, JACOB MAIER, NICHOLAS LENZ, and CLARENCE E. RADMER, all citizens of the United States, and residents of Milwaukee, in the county of Milwaukee and State of Wisconsin, have invented certain new and useful Improvements in Cream Separators for Milk Containers; and we do hereby declare that the following is a full, clear, and exact description thereof.

Our invention refers to cream separators and it has for its object to provide a simple siphon tube for separating the cream in original containers or bottles. The construction and arrangement of the siphon is such that it can be inverted and immersed in the neck of the bottle for receiving an initial volume of cream that will extend beyond the return bend, whereby the siphon is started when inverted for delivery purposes, the long leg of the siphon being intermediately bowed both for the purpose of preventing the siphon, when inverted, from dropping too far in the bottle, and to hold the discharged end of the siphon in its proper delivery position when in operation.

A more specific object of the invention is the provision of improvements in the device of the kind for which application Serial No. 570942 was filed by applicant and other inventors on June 26, 1922, whereby the purity of the cream is assured, devices preventing the drawing off of milk therewith. A disk having resilient fingers is removably attached to the mouth of the tube spaced therefrom sufficiently to permit a free flow of cream. As the velocity of the liquid is greatest at the mouth of the tube and decreases radially away therefrom, the disk effectually operates to prevent the upward flow of milk into the tube, so that pure, undiluted cream is drawn off. The disk is conveniently put in position and readily removable so that the initial operation of filling part of the tube with cream is readily effected. The springs on the disk which operate to secure it to the end of the tube have upwardly directed lips among which the tube may be readily centered so that the tube may be pushed inwardly towards the disk, causing the springs to move outwardly. Thus the parts may be readily assembled.

With the above objects in view the invention consists in certain peculiarities of construction and combination of parts as set forth hereinafter with reference to the accompanying illustrations and subsequently claimed.

In the drawings,

Figure 1 represents a sectional elevation of a portion of the milk bottle having fitted therein, as shown in dotted lines, an inverted siphon embodying the features of the invention, the siphon being in position to receive a predetermined filling of cream whereby it will automatically draw off the cream when it is removed and inverted to delivery position shown in full lines.

Figure 2 is a horizontal section through the tube showing the disk.

Referring by characters to the drawing, A represents the mouth or lip of a standard milk bottle B. Referring to Figure 2 of the drawing, the siphon is shown in its cream delivery position, with relation to the bottle contents, and the short leg of the siphon is of a length approximately equal to the depth of the cream contained in the bottle. The short leg of the siphon is merged into a return bend or throat 2, which throat rests upon the lip of the bottle and the long or discharge leg 3 of the siphon, is bowed inwardly or toward the straight leg 1, intermediate of its length, as indicated at X. The bowed intermediate portion X of the long leg engages the side walls of the bottle and forms a rest for the siphon, whereby it will assume its proper position with relation to the bottle and the discharge end 3 of the long leg of said siphon is thus positioned obliquely or flared outwardly from the side wall of the bottle, whereby a clearance between the bottle and the discharge mouth of said leg is of sufficient distance to permit clearance between the associated wall of the bottle for placing a cream receiving container under the mouth 3' of said leg.

In the operation of the device for sanitary reasons, the siphon is started by simply inverting it and dropping the inverted short leg and the upper portion of the bowed long leg into the mouth of the bottle, the intermediate bowed portion X being so proportioned with relation to the entrance of the short leg that the siphon will, in a standard mouth bottle, drop the required distance into the neck to receive a column of cream which is of sufficient volume to start the siphon in a discharging action when it is reversed, as shown in full lines. After the initial column has entered a portion of the short leg and portion of the long leg of the siphon, the operator may close the discharge end or mouth of the siphon leg 3 by the thumb or any suitable closure, whereby the column of cream, partly filling the siphon, will remain intact momentarily, while said siphon is being inverted to assume a position shown in full lines with relation to the bottle. Thus the siphon is started automatically and it will discharge approximately the entire body of cream from the upper portion of the milk, which body of cream would automatically rise and assume a depth in the neck of the bottle, as indicated in the drawing.

Springs 4 have feet 5 thereof secured to disk 6. The upper end of the springs are outwardly directed being shaped into lips 7. The mouth of the tube is adapted readily in assembling the parts to be centered among the springs and the movement of the tube downwardly forces the lips outwardly and permits the springs to contact with the tube adjacent to the mouth thereof, exerting an effective gripping action. The extreme limit of movement of the tube toward the disk is determined by annular bead 8 formed on the tube adapted to contact with the lips 7. The mouth of the tube is thus spaced from the center of the disk, the spacing being sufficient to permit free flow of liquid into the tube. The velocity of cream flowing into the mouth of the tube is greatest immediately at the mouth and decreases radially away therefrom. It is, therefore, apparent that the rate of flow at the edge of the disk is very slow; consequently, there is no tendency of the milk below the line of demarcation between the cream and the milk, to move towards the mouth of the tube. The disk exerts an effective baffle action in consequence of which only the cream is permitted to flow into the tube. The mouth of the tube is so spaced from the bowed portion X, that the disk is centered with respect to the neck of the bottle. It is apparent, therefore, that the disk is readily insertable into the bottle. The centering of the disk shown in full lines is the result of the cooperative action of the return bend resting on the lip of the milk bottle, and bowed portion X resting on the outer surface of the milk bottle. A short distance above bead 8, the tube is bent at Y so that the portion immediately below the bend Y is substantially vertical. This results in the substantially horizontal positioning of the disk 6.

The disk may be easily slipped off the end of the tube which facilitates the cleaning of parts, so that they may be maintained, at all times, in sanitary condition. When the tube is initially filled with cream, as shown in dotted lines, the disk is removed as its presence would interfere with the entry of the tube into the bottle. It will be noted that the spacing of the mouth of the tube from bent portion X, is such that the operation of submerging the tube is not interfered with, the mouth of the bottle being large enough to permit the immersion at the mouth of the tube.

The siphon is preferably formed from glass, for sanitary reasons, but may be made of other materials, such as aluminum. Owing to the fact that there are no obstructions, it can be readily utilized, and of course, the manufacture is consequently reduced to a minimum. The parts are conveniently assembled and operated and the siphoning operation is rapid. The entire quantity of cream is removable, and the operation is such that there is substantially no dilution with milk.

We claim:—

The combination of a rigid siphon tube, a disk positioned below the mouth thereof, means detachably securing said disk to the end of said tube, said tube having a bend 2 therein adapted to rest on the lip of a bottle, and a bend spaced from said disk and adapted to rest against the side of a bottle, said tube diverging outwardly from said bend for the feeding of liquid into a container, the contact of said bend with the side of the bottle operating to maintain said disk substantially centrally and horizontally disposed in said bottle, whereby on the removal of said disk, said tube may be inverted and inserted in the neck of said bottle to receive liquid by which the siphon action may be initiated.

In testimony that we claim the foregoing we have hereunto set our hands at Milwaukee, in the county of Milwaukee and State of Wisconsin.

JACOB MAIER.
NICHOLAS LENZ.
CLARENCE E. RADMER.